(12) United States Patent
Yang et al.

(10) Patent No.: US 10,061,436 B2
(45) Date of Patent: Aug. 28, 2018

(54) TOUCH DISPLAY PANEL, DRIVING METHOD AND TOUCH DISPLAY DEVICE

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventors: Wenbin Yang, Xiamen (CN); Kangpeng Yang, Xiamen (CN); Yumin Xu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/405,297

(22) Filed: Jan. 12, 2017

(65) Prior Publication Data
US 2017/0123583 A1    May 4, 2017

(30) Foreign Application Priority Data
Aug. 31, 2016   (CN) .......................... 2016 1 0789487

(51) Int. Cl.
*G06F 3/00*    (2006.01)
*G06F 3/041*   (2006.01)
*G06F 3/044*   (2006.01)

(52) U.S. Cl.
CPC ............ *G06F 3/0416* (2013.01); *G06F 3/044* (2013.01); *G06F 3/0412* (2013.01); *G06F 2203/04107* (2013.01)

(58) Field of Classification Search
CPC ............................... G06F 3/0416; G06F 3/044
See application file for complete search history.

(56) References Cited

U.S. PATENT DOCUMENTS

| | | | |
|---|---|---|---|
| 2012/0068961 A1 | 3/2012 | Mizuhashi et al. | |
| 2016/0274712 A1* | 9/2016 | Liu | G06F 3/0412 |
| 2016/0291750 A1* | 10/2016 | Chai | G06F 3/044 |
| 2017/0115769 A1* | 4/2017 | Ding | G06F 3/044 |
| 2017/0212634 A1* | 7/2017 | Huang | G06F 3/0418 |
| 2017/0315659 A1* | 11/2017 | Kuroiwa | G06F 3/0416 |

FOREIGN PATENT DOCUMENTS

CN           102411460 A        4/2012

\* cited by examiner

*Primary Examiner* — Erin M File
(74) *Attorney, Agent, or Firm* — Kilpatrick Townsend & Stockton LLP (57) ABSTRACT

A touch display panel, a driving method and a touch display device are provided. Touch and display are driven synchronously in the touch display panel. That is, touch detection is implemented while the display is performed and there is no need to perform the display and the touch in different stages, thereby avoiding limiting an improvement on a report rate, and ensuring a high report rate of the touch display device.

14 Claims, 11 Drawing Sheets

TOUCH DISPLAY PANEL, DRIVING METHOD AND TOUCH DISPLAY DEVICE

CROSS REFERENCE OF RELATED APPLICATION

The present application claims the priority to Chinese Patent Application No. 201610789487.5, titled "TOUCH DISPLAY PANEL, DRIVING METHOD AND TOUCH DISPLAY DEVICE", filed on Aug. 31, 2016 with the State Intellectual Property Office of the PRC, which is incorporated herein by reference in its entirety.

FIELD

The present disclosure relates to the field of touch display technology, and particularly to a touch display panel, a driving method and a touch display device.

BACKGROUND

In the initial stage of the development of touch display, a touch display panel is formed by fitting a touch panel and a display panel, to realize touch and display. In this case, the touch panel and the display panel are prepared separately, which results in high cost, large thickness and low production efficiency. With the development of built-in technology, an electrode layer of an array substrate in the display panel can be reused as a touch emission electrode. For example, a common electrode layer is also used as a touch emission electrode for touch detection, a touch induction electrode is fabricated on another substrate of the display panel, so that touch control and display control can be performed in a timing sequence manner by time-sharing driving, thereby realizing a touch function and a display function. In this way, the touch emission electrode and the touch induction electrode are built in the display panel, thereby greatly reducing production cost and improving production efficiency and reducing the thickness of the panel.

Specifically, in a case that the common electrode layer is reused as the touch emission electrode, the common electrode layer can be divided into multiple strip electrodes. Also, each touch emission electrode is provided with a signal via a touch lead wire, a touch signal is provided to the touch emission electrode via the touch lead wire corresponding to the touch emission electrode within a touch time period, and a common electrode signal is provided to the touch emission electrode via the touch lead wire corresponding to the touch emission electrode within a display time period. However, in an existing touch display device, a report rate is low, and an improvement on the report rate is limited.

SUMMARY

In view of this, a touch display panel, a driving method and a touch display device are provided in the present disclosure, touch and display can be driven synchronously in the touch display panel. That is, touch detection can be implemented while the display is performed, and there is no need to perform the display and the touch in different stages, thereby avoiding limiting an improvement on the report rate and ensuring a high report rate of the touch display device.

In order to realize the objectives described above, the present disclosure provides technical solutions as follows.

A touch display panel is provided in the present disclosure, which includes an array substrate and a color film substrate arranged to be opposite to each other, multiple touch emission electrodes, multiple touch induction electrodes and a driving unit. The array substrate includes a pixel unit array including multiple pixel units. Each of the pixel units includes a pixel electrode. All pixel electrodes are arranged in multiple pixel electrode columns in a first direction and are arranged in multiple pixel electrode rows in a second direction, and the first direction intersects with the second direction. The multiple touch emission electrodes are arranged in the first direction and are reused as a common electrode layer of the array substrate. Each of the touch emission electrodes corresponds to at least one of the pixel electrode columns. The multiple touch induction electrodes are arranged to be opposite to the touch emission electrodes and are arranged in the second direction. The driving unit is electrically connected to the touch emission electrodes and the pixel electrodes, the driving unit is configured to transmit a common electrode signal to the touch emission electrodes and transmit a display signal to the pixel electrodes in a process of scanning the multiple pixel electrode rows line by line, transmit a touch signal to the touch emission electrodes one by one, and transmit a superposed signal to the pixel electrode corresponding to the touch emission electrode which currently receives the touch signal in a process of transmitting the common electrode signal, where the superposed signal is generated by superposing the display signal and the touch signal.

Optionally, a time period during which the driving unit transmits the touch signal to the touch emission electrodes one by one for once is defined as one touch stage, and the driving unit at least completes one touch stage when completing scanning multiple pixel electrode rows line by line.

Optionally, the driving unit at least completes multiple touch stages when completing scanning the multiple pixel electrode rows line by line, and adjacent touch stages are separated with a preset time interval.

Optionally, the multiple touch induction electrodes are arranged in the color film substrate.

Correspondingly, a driving method is further provided in the present disclosure, the driving method is used to drive the touch display panel described above. The driving method includes: transmitting a common electrode signal to the touch emission electrodes and transmitting a display signal to the pixel electrodes in a process of scanning multiple pixel electrode rows line by line, transmitting a touch signal to the touch emission electrodes one by one, and transmitting a superposed signal to the pixel electrode corresponding to the touch emission electrode which currently receives the touch signal in a process of transmitting the common electrode signal, where the superposed signal is generated by superposing the display signal and the touch signal.

In addition, a touch display panel is further provided in the present disclosure, which includes an array substrate and a first substrate arranged to be opposite to each other, multiple touch emission electrodes, multiple touch induction electrodes and a driving unit. The array substrate includes a pixel unit array including multiple pixel units, each of the pixel units includes an anode, and all anodes are arranged in multiple anode columns in a first direction and are arranged in multiple anode rows in a second direction, and the first direction intersects with the second direction. The multiple touch emission electrodes are arranged in the first direction and are reused as a cathode layer of the array substrate, each of the touch emission electrodes corresponds to at least one of the anode columns. The multiple touch induction electrodes are arranged to be opposite to the touch emission electrodes and are arranged in the second direction. The driving unit is electrically connected to the touch emission electrodes and the anodes, and the driving unit is configured to transmit a cathode signal to the touch emission electrodes and transmit a display signal to the anodes in a process of scanning the multiple anode rows line by line, and transmit a touch signal to the touch emission electrodes one by one and transmit a superposed signal to the anode corresponding to the touch emission electrode which currently receives the touch signal in a process of transmitting the cathode signal, where the superposed signal is generated by superposing the display signal and the touch signal.

Optionally, a time period during which the driving unit transmits the touch signal to the touch emission electrodes one by one for once is defined as one touch stage, and the driving unit at least completes one touch stage when completing scanning multiple anode rows line by line.

Optionally, the driving unit at least completes multiple touch stages when completing scanning the multiple anode rows line by line, and adjacent touch stages are separated with a preset time interval.

Optionally, the multiple touch induction electrodes are arranged in the first substrate.

Correspondingly, a driving method is further provided in the present disclosure, the driving method is used to drive the touch display panel described above. The driving method includes: transmitting a cathode signal to the touch emission electrodes, transmitting a display signal to the anodes in a process of scanning the multiple anode rows line by line, transmitting a touch signal to the touch emission electrodes one by one and transmitting a superposed signal to an anode corresponding to the touch emission electrode which currently receives the touch signal in a process of transmitting the cathode signal, where the superposed signal is generated by superposing the display signal and the touch signal.

In addition, a touch display device is further provided in the present disclosure, which includes the touch display panel described above.

Compared with the conventional technology, the technical solutions in the present disclosure at least have advantages as follows.

A touch display panel, a driving method and a touch display device are provided in the present disclosure. Touch emission electrodes are reused as a common electrode layer or a cathode layer, in a process of driving the display panel and scanning an image of one frame, a common electrode signal or a cathode signal is transmitted to the touch emission electrodes, and a display signal is transmitted to pixel electrodes or anodes. In a process of transmitting the common electrode signal or the cathode signal, a touch signal is transmitted to the touch emission electrodes one by one, and a superposed signal is transmitted to the pixel electrode or the anode corresponding to the touch emission electrode which currently receives the touch signal, the superposed signal is generated by superposing the display signal and the touch signal. Thus, since that the superposed signal is transmitted to the pixel electrode or the anode corresponding to the touch emission electrode while transmitting the touch signal to the touch emission electrode, and the touch signal on the pixel electrode or the anode can eliminate the influence of the touch signal on the touch emission electrode, a voltage difference between the touch emission electrode and the pixel electrode or the anode remains unchanged, a display effect of the display panel is not affected while ensuring that the touch detection is completed. It can be known from above that, in the technical solutions according to the embodiments disclosed by the present disclosure, touch and display of the touch display panel can be driven synchronously, that is, the touch detection is implemented while the display is performed, there is no need to perform the display and the touch in different stages, thereby avoiding limiting the improvement on a report rate, and ensuring a high report rate of the touch display device.

BRIEF DESCRIPTION OF THE DRAWINGS

The drawings to be used in the description of the embodiments in the present disclosure or the conventional technology will be described briefly as follows, so that the technical solutions according to the embodiments disclosed by the present disclosure or according to the conventional technology will become clearer. It is apparent that the drawings in the following description only illustrate some embodiments. For those skilled in the art, other drawings may be obtained according to these drawings without any creative work.

DETAILED DESCRIPTION OF THE EMBODIMENTS

Technical solutions according to embodiments disclosed by the present disclosure are described clearly and completely hereinafter in conjunction with drawings used in the embodiments. Apparently, the described embodiments are only some embodiments disclosed by present disclosure rather than all the embodiments. Any other embodiments obtained by those skilled in the art based on the embodiments disclosed by the present disclosure without any creative work fall within the scope of protection of the present disclosure.

As described in the background part, in a case that a common electrode layer is reused as a touch emission electrode, the common electrode layer may be divided into multiple strip electrodes. Each touch emission electrode is provided with a signal via a touch lead wire, a touch signal is provided to the touch emission electrode via the touch lead wire corresponding to the touch emission electrode within a touch time period, a common electrode signal is provided to the touch emission electrode via the touch lead wire corresponding to the touch emission electrode within a display time period. However, since display and touch are controlled in a time-sharing manner in an existing touch display device, and a time period for a touch stage is reduced gradually with improvement of a resolution rate of a display panel and improvement of a refresh frequency of the display, an improvement on a report rate of the existing touch display panel is limited, and the report rate of the existing touch display panel is reduced.

Based on this, a touch display panel, a driving method and a touch display device are provided in the embodiments disclosed by the present disclosure, display and touch are driven synchronously in the touch display panel. That is, touch detection can be implemented while the display is performed, and there is no need to perform the display and the touch in different stages, thereby avoiding limiting the improvement on the report rate, and ensuring a high report rate of the touch display device. In order to realize objectives described above, the technical solutions according to the embodiments disclosed by the present disclosure are described hereinafter in detail in conjunction with FIG. 1a to FIG. 7.

First Embodiment

Figure 1A:
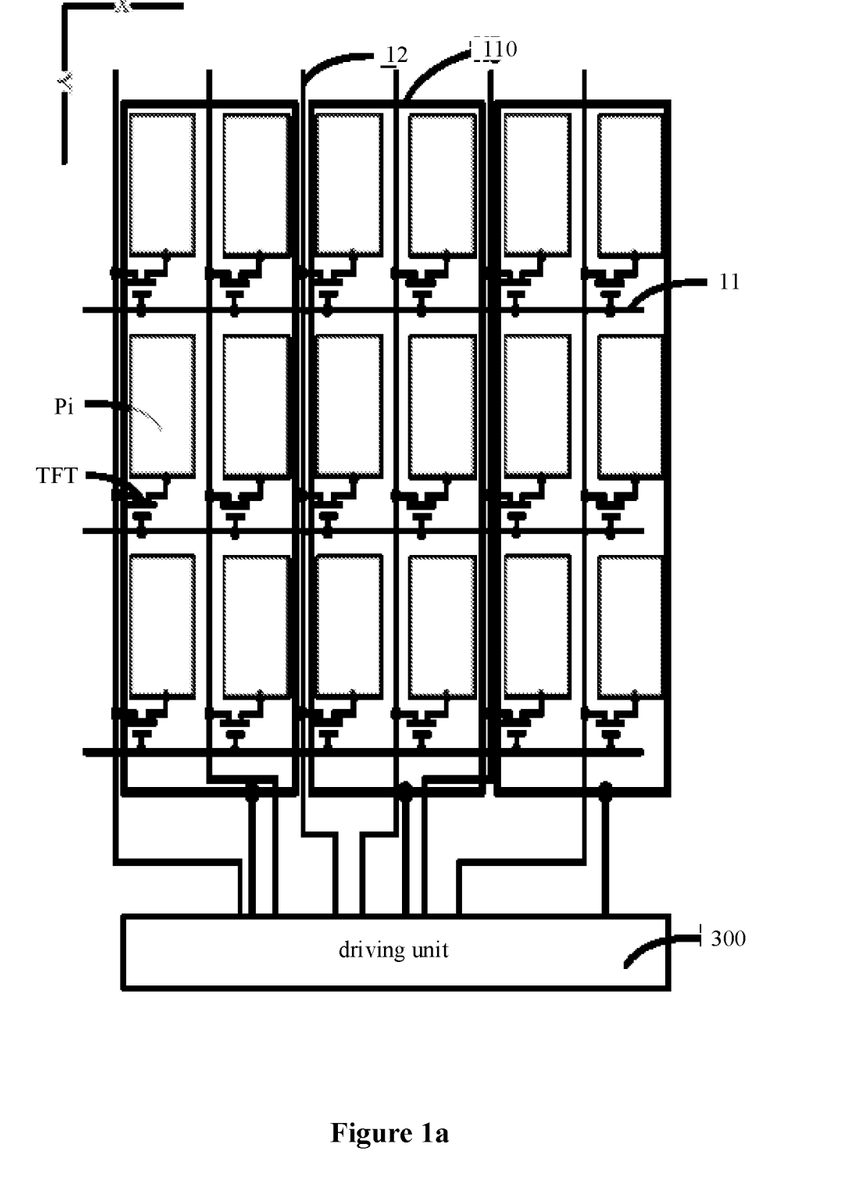
FIG. 1a is a schematic plan view of a touch display panel according to a first embodiment disclosed by the present disclosure.
Figure 1B:
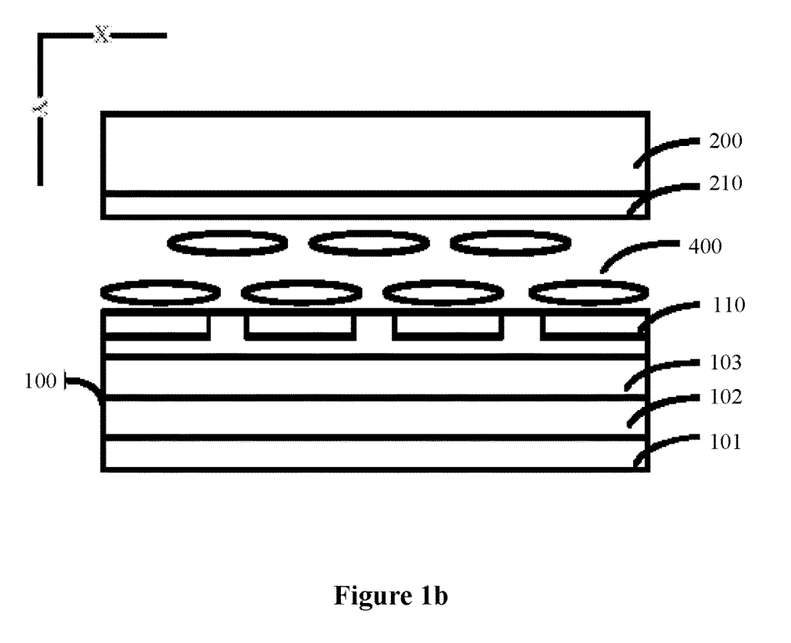
FIG. 1b is a schematic sectional view of a touch display panel according to a first embodiment disclosed by the present disclosure.

In conjunction with FIG. 1a and FIG. 1b, FIG. 1a is a schematic plan view of a touch display panel according to a first embodiment disclosed by the present disclosure, and FIG. 1b is a schematic sectional view of a touch display panel according to a first embodiment disclosed by the present disclosure, the touch display panel includes an array substrate 100 and a color film substrate 200 arranged to be opposite to each other, multiple touch emission electrodes 110, multiple touch induction electrodes 210 and a driving unit 300.

The array substrate 100 includes a pixel unit array including multiple pixel units. Each of the pixel units includes a pixel electrode Pi, and all pixel electrodes Pi are arranged in multiple pixel electrode columns in a first direction X, and are arranged in multiple pixel electrode rows in a second direction Y. The first direction X intersects with the second direction Y.

The multiple touch emission electrodes 110 are arranged in the first direction X and are reused as a common electrode layer of the array substrate 100, each of the touch emission electrodes 110 corresponds to at least one of the pixel electrode columns.

The multiple touch induction electrodes 210 are arranged to be opposite to the touch emission electrodes 110 and are arranged in the second direction Y.

The driving unit 300 is electrically connected to the touch emission electrodes 110 and the pixel electrodes Pi.

The driving unit 300 is configured to transmit a common electrode signal to the touch emission electrodes 110 and transmit a display signal to the pixel electrodes Pi in a process of scanning the multiple pixel electrode rows line by line, and transmit a touch signal to the touch emission electrodes 110 one by one and transmit a superposed signal to the pixel electrode Pi corresponding to the touch emission electrode 110 which currently receives the touch signal in a process of transmitting the common electrode signal, the superposed signal is generated by superposing the display signal and the touch signal.

Specifically, the touch display panel according to the first embodiment disclosed by the present disclosure is a liquid crystal touch display panel, which includes an array substrate 100, a color film substrate 200 and a liquid crystal layer 400 arranged between the array substrate 100 and the color film substrate 200. Specifically, the array substrate 100 mainly includes a substrate 101, a transistor array layer 102 on a surface of a side of the substrate 101, a planarizing layer 103 on a side of the transistor array layer 102 facing away from the substrate 101, and a pixel electrode layer and a common electrode layer which are insulated with each other and arranged on a side of the planarizing layer 103 facing away from the substrate 101. The pixel electrode layer includes multiple pixel electrodes Pi, and the common electrode layer is reused as multiple touch emission electrodes 110. The touch emission electrode 110 according to the first embodiment disclosed by the present disclosure may correspond to one pixel electrode column, or correspond to multiple pixel electrode columns, which is not limited in the present disclosure, and is designed based on actual needs.

Specifically, the transistor array layer 102 includes multiple gate lines 11 and multiple data lines 12, the multiple gate lines 11 intersect with the multiple data lines 12, to define multiple pixel units and therefore form a pixel unit array, that is, the first direction X is perpendicular to the second direction Y. The first direction X may be an extension direction of the gate lines 11, and the second direction Y may be an extension direction of the data lines 12. The pixel unit includes a pixel electrode Pi and a transistor TFT, the pixel electrode Pi is connected to the gate line 11 and the data line 12 via the transistor TFT. That is, the pixel electrode Pi is connected to a first electrode of the transistor TFT, a second electrode of the transistor TFT is connected to the data line 12, a gate of the transistor TFT is connected to the gate line 11. In the first embodiment, preferably, the pixel electrode Pi is electrically connected to the driving unit 300 via the data line 12. That is, the driving unit 300 provides a display signal and a superposed signal of the display signal and the touch signal to the pixel electrode Pi via the data line 12.

It should be illustrated that the touch induction electrodes 210 and the touch emission electrodes 110 according to the first embodiment are arranged to be opposite to each other, to form a mutual capacitance touch structure. A hierarchical position of the touch induction electrode 210 is not limited in the first embodiment. Preferably, the multiple touch induction electrodes 210 are arranged in the color film substrate 200. In addition, in a case that the touch induction electrodes 210 are arranged in the color film substrate 200, the touch induction electrodes 210 may be located at any one layer of a transparent substrate, a black matrix layer, a color blocking layer and a flat layer of the color film substrate 200, which is not limited in the present disclosure and is designed based on actual needs.

For the touch display panel according to the first embodiment disclosed by the present disclosure, a driving method is further provided in the first embodiment, the driving method is used to drive the touch display panel according to the first embodiment described above. The driving method includes: transmitting a common electrode signal to the touch emission electrodes 110 and transmitting a display signal to the pixel electrodes Pi in a process of scanning the multiple pixel electrode rows line by line, and transmitting a touch signal to the touch emission electrodes 110 one by one and transmitting a superposed signal to a pixel electrode Pi corresponding to the touch emission electrode 110 which currently receives the touch signal in a process of transmitting the common electrode signal, the superposed signal is generated by superposing the display signal and the touch signal.

Figure 2:
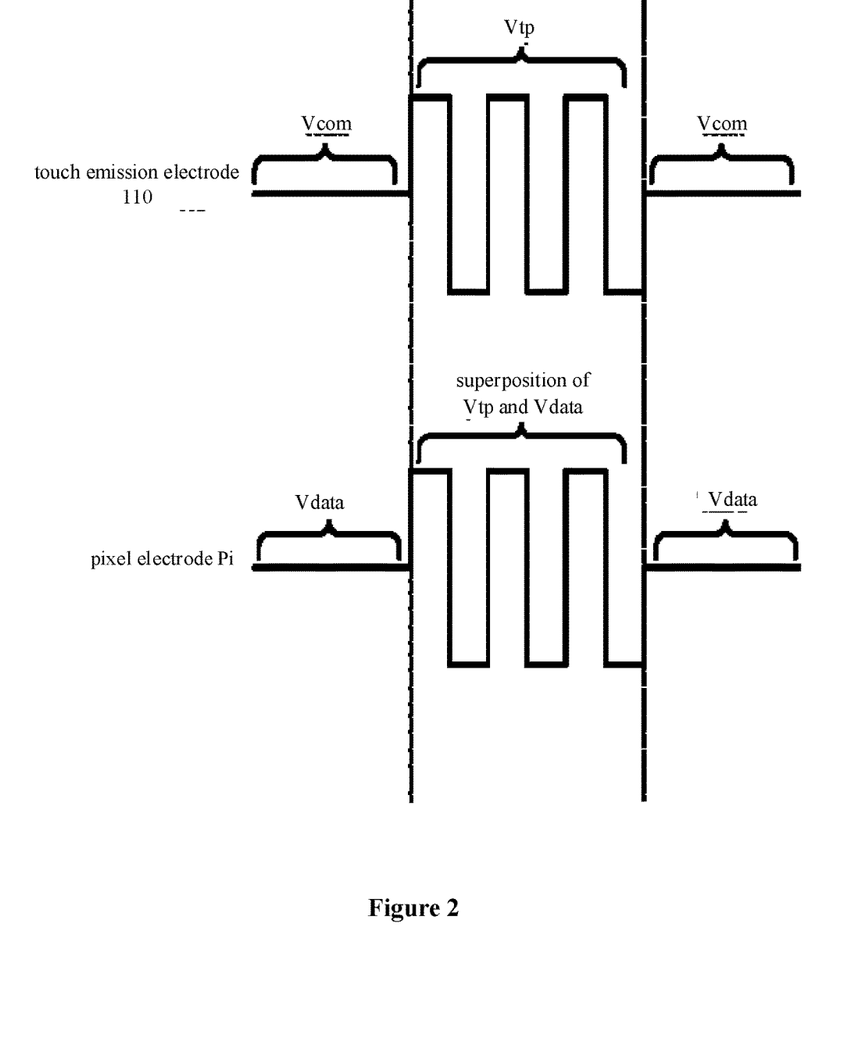
FIG. 2 is a schematic diagram of receiving a signal by a touch emission electrode and a pixel electrode corresponding to the touch emission electrode according to a first embodiment disclosed by the present disclosure.

Specifically, in a case that the touch display panel is to display an image, the multiple pixel electrode rows are scanned line by line, an image of one frame is displayed by the touch display panel when completing scanning all pixel electrode rows for once. In a process of displaying the image of one frame by the touch display panel, since that the touch emission electrodes 110 are reused as the common electrode layer, the driving unit 300 transmits a common electrode signal Vcom to the touch emission electrodes 110 and transmits a display signal Vdata to the pixel electrodes Pi, so that a storage capacitor is formed between the touch emission electrode 110 and the pixel electrode Pi corresponding to the touch emission electrode 110. Also, in order to make the touch display panel to synchronously achieve touch detection, the driving unit 300 transmits a touch signal Vtp to the touch emission electrodes 110 one by one in a process of transmitting the common electrode signal Vcom, to realize the mutual capacitance touch detection in coordination with the touch induction electrodes 210. With reference to FIG. 2, which is a schematic diagram of receiving a signal by a touch emission electrode and a pixel electrode corresponding to the touch emission electrode according to the first embodiment, in order to avoid an influence of the touch detection on a display effect, the driving unit 300 transmits a superposed signal to a pixel electrode Pi corresponding to the touch emission electrode 110 which currently receives the touch signal, the superposed signal is generated by superposing the display signal Vdata and the touch signal Vtp. Specifically, the touch signal on the pixel electrode Pi and the touch signal on the touch emission electrode 110 cancel out with each other, so that a voltage difference between two polar plates of the storage capacitor remains unchanged, thereby realizing an objective that touch is implemented while the display is performed, and the touch detection has no influence on the display.

Figure 3A:
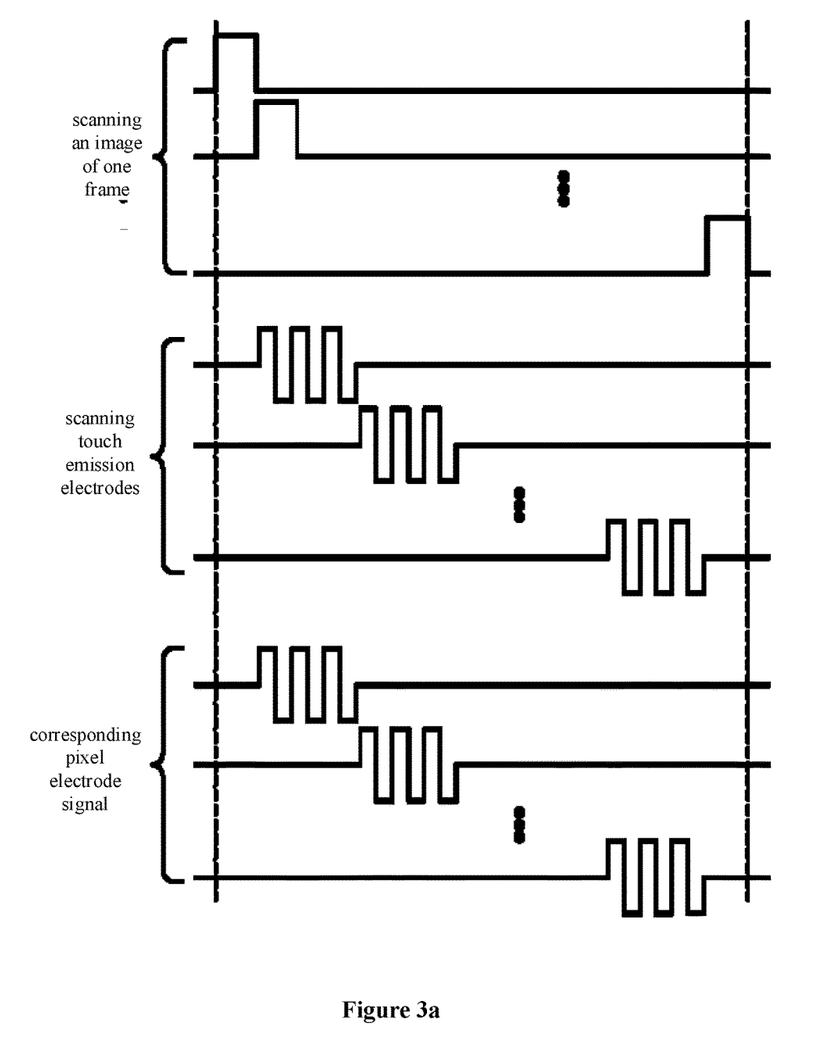
FIG. 3a is a sequence diagram according to a first embodiment disclosed by the present disclosure.
Figure 3B:
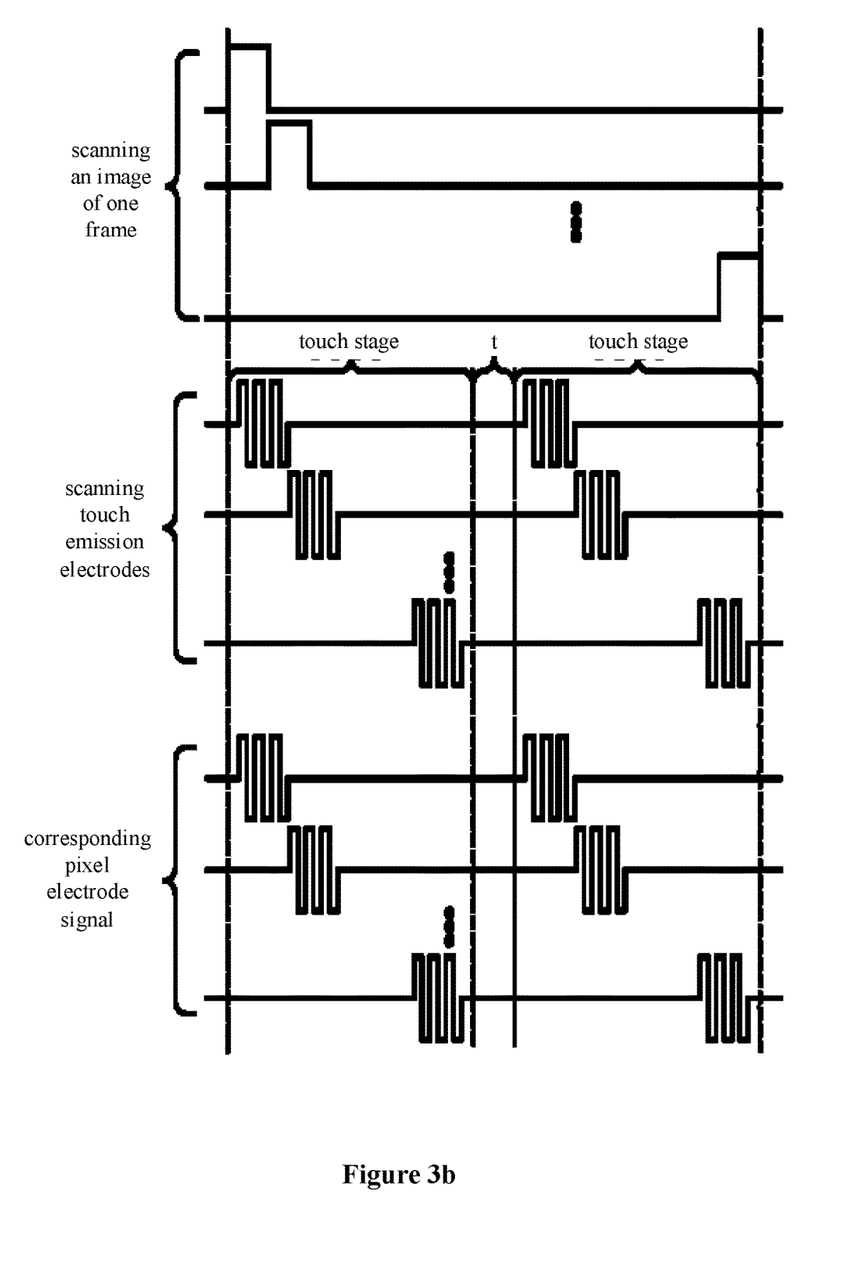
FIG. 3b is another sequence diagram according to a first embodiment disclosed by the present disclosure.

Specifically, in the touch display panel according to the first embodiment, at least one touch stage can be achieved in a process of scanning an image of one frame. In conjunction with FIG. 3a and FIG. 3b, FIG. 3a is a sequence diagram according to the first embodiment disclosed by the present disclosure, FIG. 3b is another sequence diagram according to the first embodiment disclosed by the present disclosure. A time period during which the driving unit 300 transmits the touch signal to the touch emission electrodes 110 one by one for once is defined as one touch stage.

Specifically, the driving unit 300 at least completes one touch stage when completing scanning multiple pixel electrode rows line by line, i.e., when an image of one frame is displayed by the touch display panel.

Specifically, as shown in FIG. 3a, the driving unit 300 completes one touch stage when the image of one frame is displayed by the touch display panel, that is, the driving unit 300 finishes a process of scanning the touch emission electrodes 110 one by one for once, and a pixel electrode signal of a pixel electrode corresponding to the touch emission electrode 110 which currently receives the touch signal is a superposed signal of the touch signal and the display signal.

In addition, multiple touch stages can be completed when an image of one frame is displayed by the touch display panel. That is, the driving unit 300 at least completes multiple touch stages when completing scanning the multiple pixel electrode rows line by line, i.e., when the image of one frame is displayed by the touch display panel, and adjacent touch stages are separated with a preset time interval t.

With reference to FIG. 3b, the driving unit 300 completes two touch stages when the image of one frame is displayed by the touch display panel. That is, the driving unit 300 finishes the process of scanning the touch emission electrodes 110 one by one for twice, and the pixel electrode signal of the pixel electrode corresponding to the touch emission electrode 110 which currently receives the touch signal is a superposed signal of the touch signal and the display signal. Specifically, a value of the preset time interval t is not limited in the present disclosure and is designed based on actual needs.

Second Embodiment

Figure 4A:
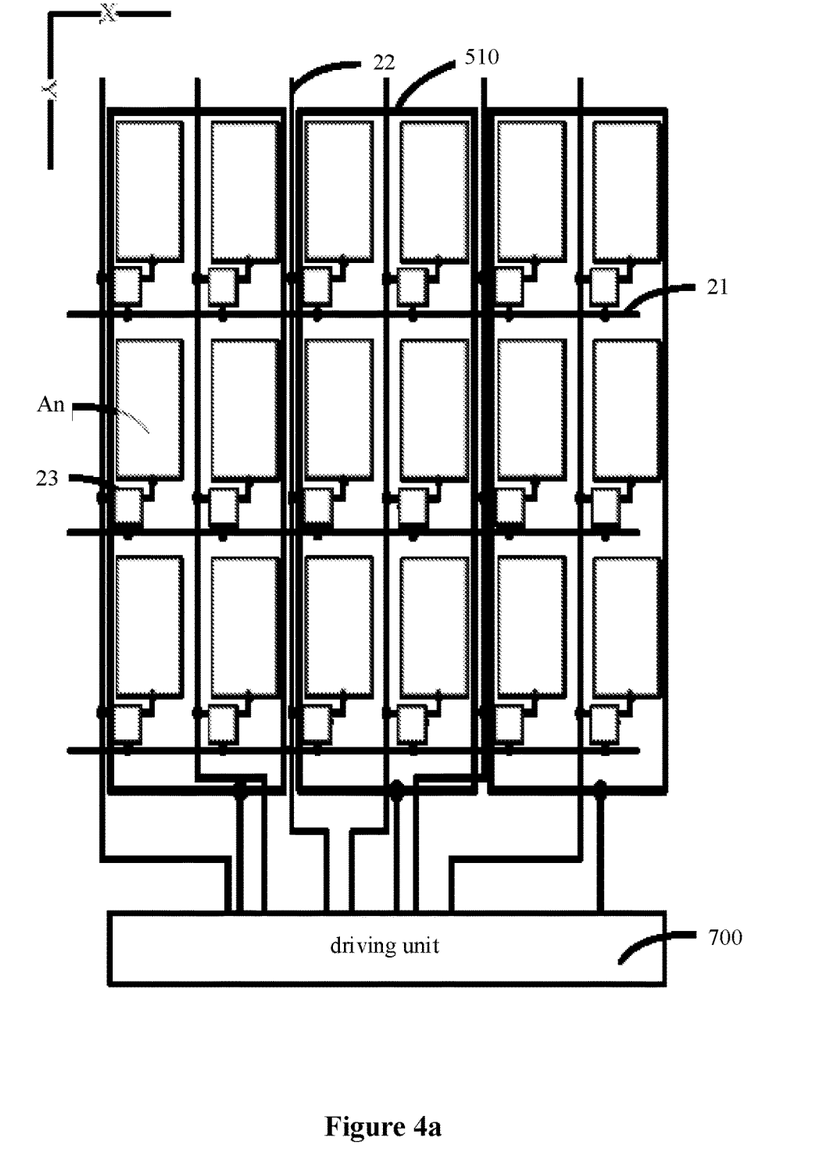
FIG. 4a is a schematic plan view of a touch display panel according to a second embodiment disclosed by the present disclosure.
Figure 4B:
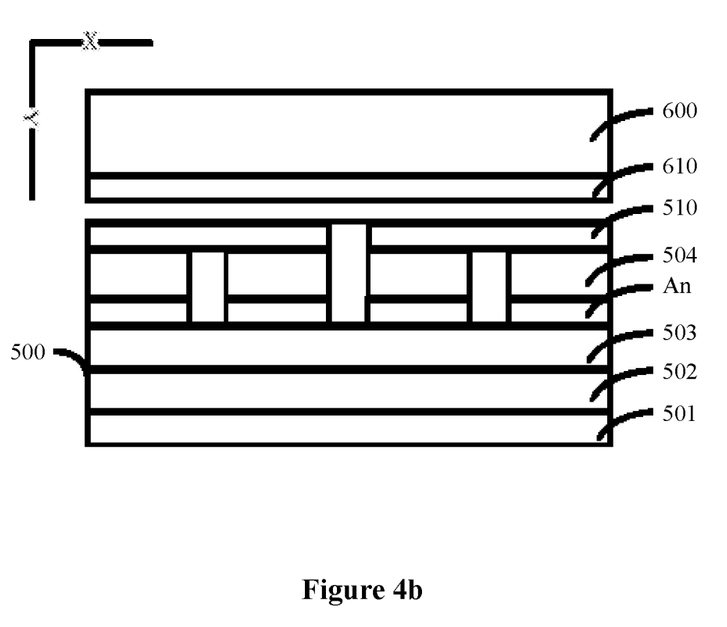
FIG. 4b is a schematic sectional view of a touch display panel according to a second embodiment disclosed by the present disclosure.

A touch display panel is further provided according to a second embodiment, in conjunction with FIG. 4a and FIG. 4b, FIG. 4a is a schematic plan view of a touch display panel according to a second embodiment disclosed by the present disclosure, and FIG. 4b is a schematic sectional view of a touch display panel according to a second embodiment disclosed by the present disclosure. The touch display panel includes an array substrate 500 and a first substrate 600 arranged to be opposite to each other, multiple touch emission electrodes 510, multiple touch induction electrodes 610 and a driving unit 700.

The array substrate 500 includes a pixel unit array including multiple pixel units, each of the pixel units includes an anode An, and all anodes An are arranged in multiple anode columns in a first direction X and are arranged in multiple anode rows in a second direction Y, the first direction X intersects with the second direction Y.

The multiple touch emission electrodes 510 are arranged in the first direction X and are reused as a cathode layer of the array substrate 500, each of the touch emission electrodes 510 corresponds to at least one of the anode columns.

The multiple touch induction electrodes 610 are arranged to be opposite to the touch emission electrodes 510 and are arranged in the second direction Y.

The driving unit 700 is electrically connected to the touch emission electrodes 510 and the anodes An.

The driving unit 700 is configured to transmit a cathode signal to the touch emission electrodes 510 and transmit a display signal to the anodes An in a process of scanning the multiple anode rows line by line, and transmit a touch signal to the touch emission electrodes 510 one by one and transmit a superposed signal to the anode An corresponding to the touch emission electrode 510 which currently receives the touch signal in a process of transmitting the cathode signal, the superposed signal is generated by superposing the display signal and the touch signal.

Specifically, the touch display panel according to the second embodiment disclosed by the present disclosure is an organic-luminescent touch display panel, which includes an array substrate 500 and a first substrate 600 equivalent to a package substrate. The array substrate 500 mainly includes a substrate 501, a transistor array layer 502 on a surface of a side of the substrate 501, a planarizing layer 503 on a side of the transistor array layer 502 facing away from the substrate 501 and an anode layer on a side of the planarizing layer 503 facing away from the substrate 501. Specifically, the anode layer includes multiple anodes An, and a light-emitting layer 504 is arranged on a side of each anode facing away from the substrate 501, and a cathode layer is arranged on a side of the light-emitting layer 504 facing away from the substrate, the cathode layer is reused as multiple touch emission electrodes 510. The touch emission electrodes 510 according to the second embodiment disclosed by the present disclosure may correspond to one anode column, or may also correspond to multiple anode columns, which is not limited in the present disclosure and is designed based on actual needs.

Specifically, the transistor array layer 502 includes multiple gate lines 21 and multiple data lines 22. The multiple gate lines 21 intersect with the multiple data lines 22 to define multiple pixel units and therefore form the pixel unit array. That is, the first direction X is perpendicular to the second direction Y, the first direction X may be an extension direction of the gate lines 21, and the second direction Y may be an extension direction of the data lines 22. The pixel unit includes an anode An and a pixel circuit 23, the anode An is connected to the gate line 21 and the data line 22 via the pixel circuit 23. In the second embodiment disclosed by the present disclosure, preferably, the anode An is electrically connected to the driving unit 700 via the data line 22, that is, the driving unit 700 provides a display signal and a superposed signal of the display signal and the touch signal to the anode An via the data line 22, to write the signals into the anode An.

It is illustrated that the touch induction electrodes 610 and the touch emission electrodes 510 according to the second embodiment are arranged to be opposite to each other, to form a mutual capacitance touch structure. A hierarchical position of the touch induction electrode 610 is not limited in the second embodiment. Preferably, the multiple touch induction electrodes 610 according to the second embodiment disclosed by the present disclosure are arranged in the first substrate 600.

For the touch display panel according to the second embodiment, a driving method is further provided according to the second embodiment, the driving method is used to drive the touch display panel according to the second embodiment described above.

The driving method includes transmitting a cathode signal to the touch emission electrodes 510 and transmitting a display signal to the anodes An in a process of scanning the multiple anode rows line by line, transmitting a touch signal to the touch emission electrodes 510 one by one, and transmitting a superposed signal to the anode An corresponding to the touch emission electrode 510 which currently receives the touch signal in a process of transmitting the cathode signal, the superposed signal is generated by superposing the display signal and the touch signal.

Figure 5:
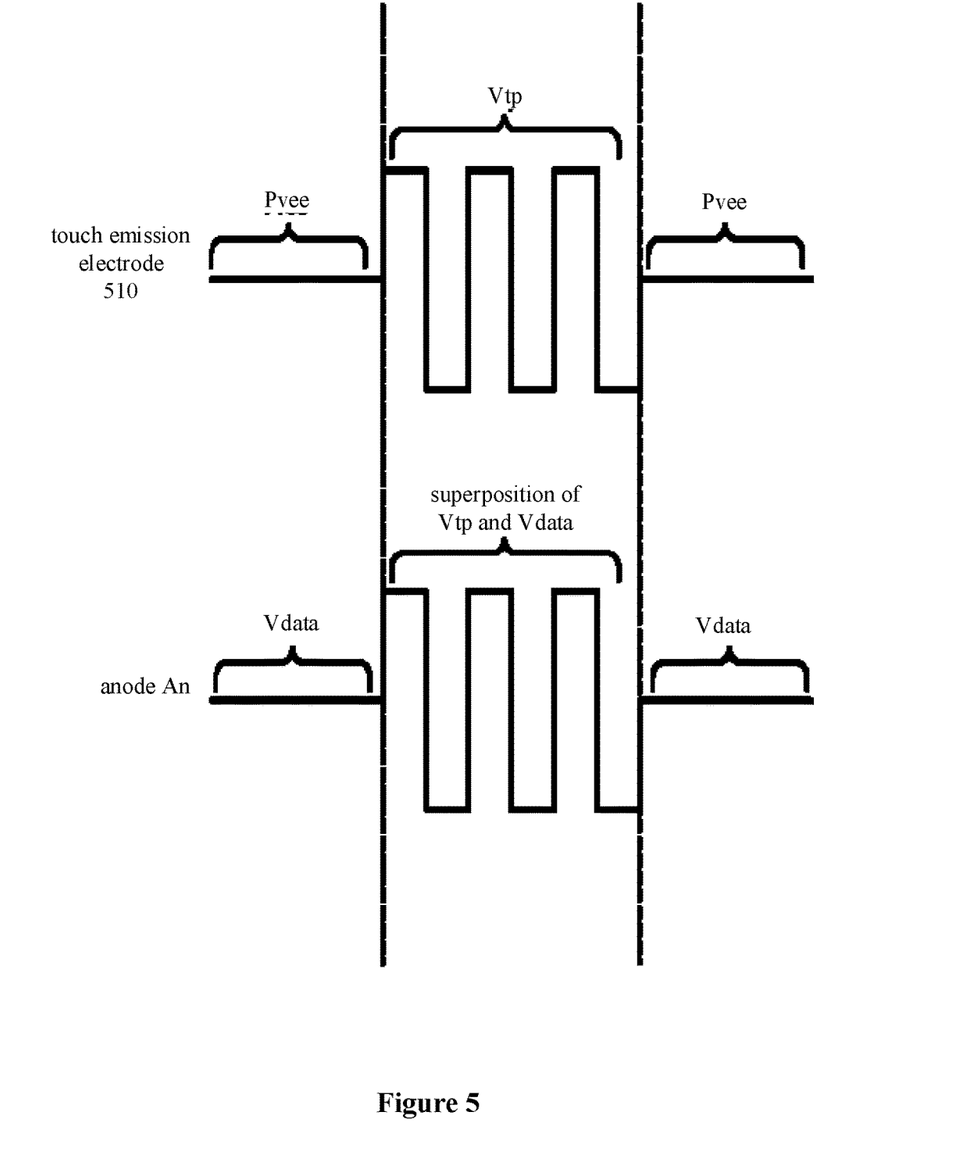
FIG. 5 is a schematic diagram of receiving a signal by a touch emission electrode and an anode corresponding to the touch emission electrode according to a second embodiment disclosed by the present disclosure.

Specifically, in a case that the touch display panel is to display an image, the multiple anode rows are scanned line by line, an image of one frame is displayed by the touch display panel when completing scanning all anode rows for once. In a process of displaying the image of one frame by the touch display panel, since that the touch emission electrodes 510 are reused as the cathode layer, the driving unit 700 transmits a cathode signal Pvee to the touch emission electrodes 510 and transmits a display signal Vdata to the anodes An, so that the light-emitting layer between the anodes An and the touch emission electrodes 510 emits light. Also, in order to make the touch display panel to synchronously realize touch detection, the driving unit 700 transmits a touch signal Vtp to the touch emission electrodes 510 one by one in a process of transmitting the cathode signal Pvee, to realize mutual capacitance detection in coordination with the touch induction electrodes 610. With reference to FIG. 5, which is a schematic diagram of receiving a signal by a touch emission electrode and an anode corresponding to the touch emission electrode according to the second embodiment disclosed by the present disclosure, in order to avoid an influence of the touch detection on a display effect, the driving unit 700 transmits a superposed signal to an anode An corresponding to the touch emission electrode 510 which currently receives the touch signal, the superposed signal is generated by superposing the display signal Vdata and the touch signal Vtp. The touch signal on the anode An and the touch signal on the touch emission electrode 510 cancel out with each other, so that a voltage difference between two sides of the light-emitting layer remains unchanged, thereby realizing the objective that touch is implemented while the display is performed, and the touch detection has no influence on the display.

Figure 6A:
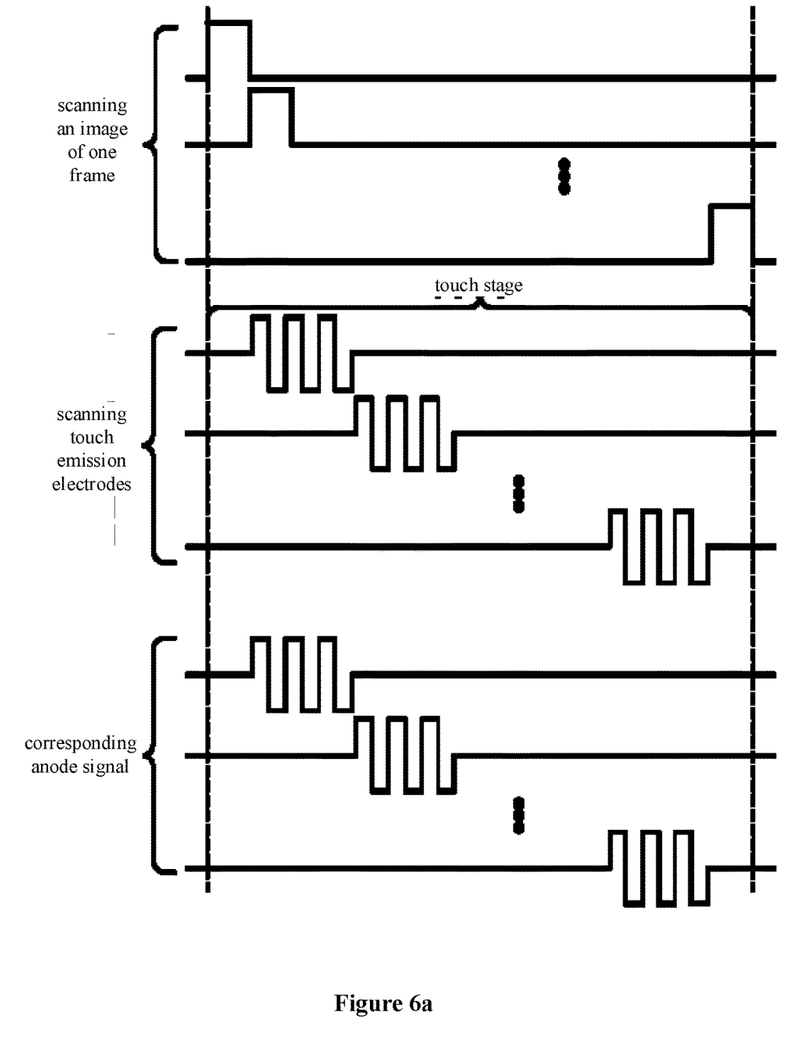
FIG. 6a is a sequence diagram according to a second embodiment disclosed by the present disclosure.
Figure 6B:
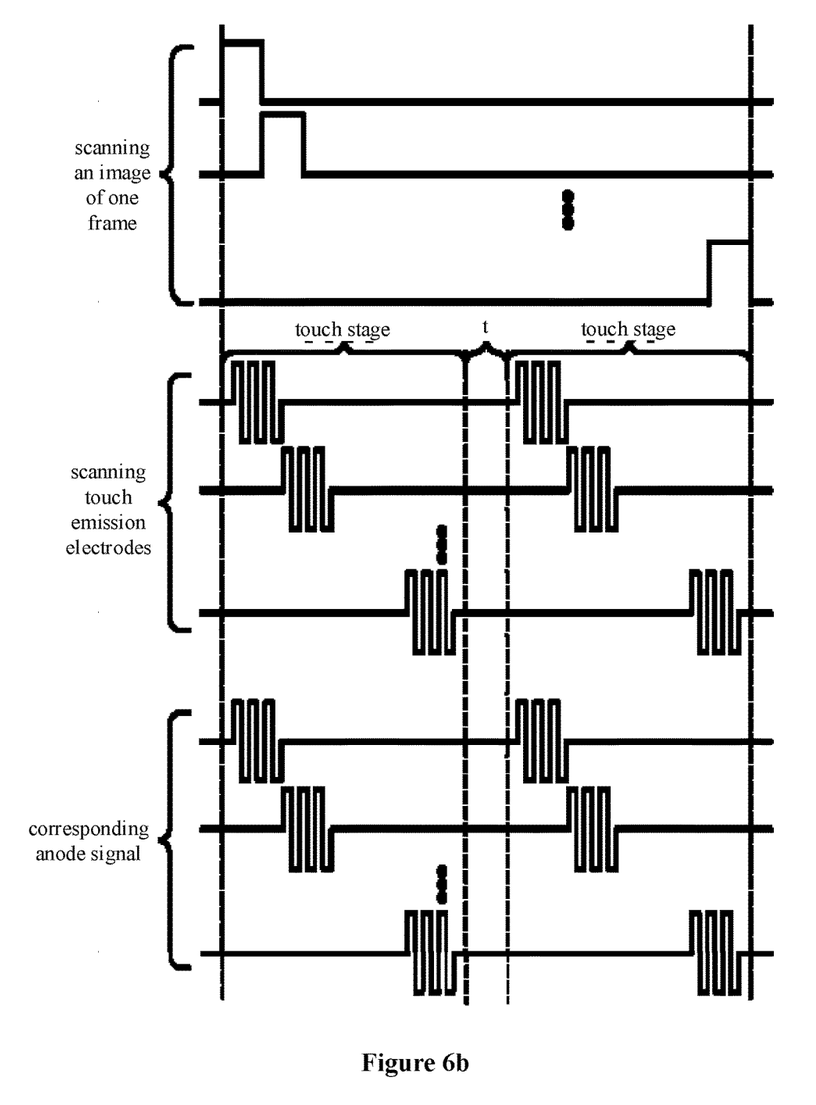
FIG. 6b is another sequence diagram according to a second embodiment disclosed by the present disclosure.
Figure 7:
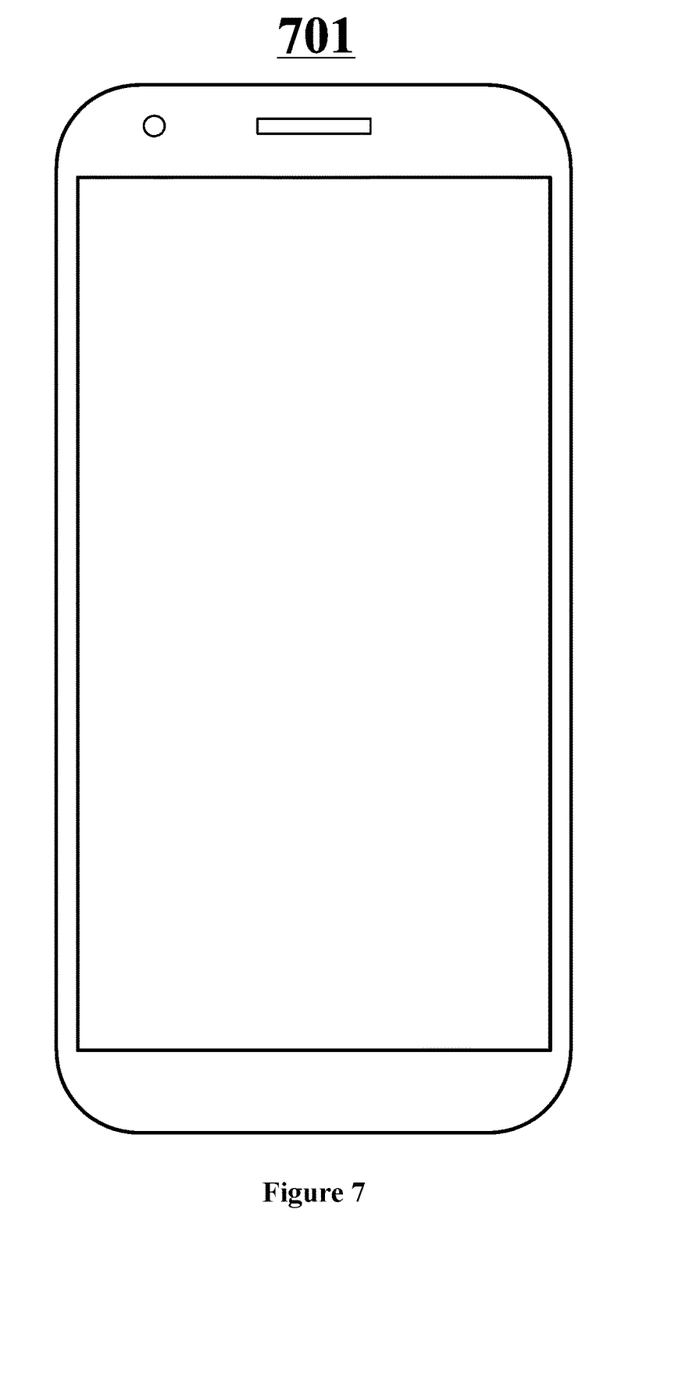
FIG. 7 is a schematic diagram of a touch display device according to an embodiment disclosed by the present disclosure.

Specifically, in the touch display panel according to the second embodiment disclosed by the present disclosure, at least one touch stage can be realized in a process of scanning an image of one frame. In conjunction with FIG. 6a and FIG. 6b, FIG. 6a is a sequence diagram according to the second embodiment disclosed by the present disclosure, FIG. 6b is another sequence diagram according to the second embodiment disclosed by the present disclosure. A time period during which the driving unit 700 transmits the touch signal to the touch emission electrodes 510 one by one for once is defined as one touch stage.

Specifically, the driving unit 700 at least completes one touch stage when completing scanning the multiple anode rows line by line, i.e., when an image of one frame is displayed by the touch display panel.

Specifically, as shown in FIG. 6a, the driving unit 700 completes one touch stage when the image of one frame is displayed by the touch display panel, that is, the driving unit 700 finishes a process of scanning the touch emission electrodes 510 one by one for once, and an anode signal of an anode corresponding to the touch emission electrode 510 which currently receives the touch signal is a superposed signal of the touch signal and the display signal.

In addition, multiple touch stages may be completed when an image of one frame is displayed by the touch display panel, That is, the driving unit 700 at least completes multiple touch stages when completing scanning the multiple anode rows line by line, and adjacent touch stages are separated with a preset time interval t.

Specifically, with reference to FIG. 6b, the driving unit 700 completes two touch stages when an image of one frame is displayed by the touch display panel. That is, the driving unit 700 finishes the process of scanning the touch emission electrodes 510 one by one for twice, and the anode signal of the anode corresponding to the touch emission electrode 510 which currently receives the touch signal is a superposed signal of the touch signal and the display signal. Specifically, a value of the preset time interval t is not limited in the present disclosure and is designed based on actual needs.

Third Embodiment

In addition, a touch display device is further provided according to a third embodiment disclosed by the present disclosure, the touch display device includes the touch display panel according to any one of the embodiments described above, as shown in FIG. 7, the touch display device is a touch screen phone 701. In addition, the touch display device according to the present disclosure may also be a notebook computer, a TV, a vehicle-mounted display device and so on, which is not limited here.

Specifically, the touch display device according to the third embodiment may be a liquid crystal touch display device, or may be an organic-luminescent touch display device, which is not limited in the present disclosure.

A touch display panel, a driving method and a touch display device are provided in the embodiments disclosed by the present disclosure. Touch emission electrodes are reused as a common electrode layer or a cathode layer, in a process of driving the display panel and scanning an image of one frame, a common electrode signal or a cathode signal is transmitted to the touch emission electrodes, and a display signal is transmitted to pixel electrodes or anodes. In a process of transmitting the common electrode signal or the cathode signal, a touch signal is transmitted to the touch emission electrodes one by one, and a superposed signal is transmitted to the pixel electrode or the anode corresponding to the touch emission electrode which currently receives the touch signal, the superposed signal is generated by superposing the display signal and the touch signal. Thus, since the superposed signal is transmitted to the pixel electrode or the anode corresponding to the touch emission electrode while transmitting the touch signal to the touch emission electrode, and the touch signal on the pixel electrode or the anode can eliminate the influence of the touch signal on the touch emission electrode, a voltage difference between the touch emission electrode and the pixel electrode or the anode remains unchanged, a display effect of the display panel is not affected while ensuring that the touch detection is completed. It can be known from above that, in the technical solutions according to the embodiments disclosed by the present disclosure, touch and display of the touch display panel can be driven synchronously. That is, the touch detection is implemented while the display is performed, and there is no need to perform the display and the touch in different stages, thereby avoiding limiting the improvement on a report rate, and ensuring a high report rate of the touch display device.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the broadest scope in accordance with the principles and novel features disclosed herein.

The invention claimed is:

1. A touch display panel, comprising:
   an array substrate and a color film substrate arranged to be opposite to each other, wherein the array substrate comprises a pixel unit array comprising a plurality of pixel units, each of the pixel units comprising a pixel electrode, all pixel electrodes being arranged in a plurality of pixel electrode columns in a first direction and being arranged in a plurality of pixel electrode rows in a second direction, the first direction intersecting with the second direction;
   a plurality of touch emission electrodes arranged in the first direction and reused as a common electrode layer of the array substrate, wherein each of the touch emission electrodes corresponds to at least one of the pixel electrode columns;
   a plurality of touch induction electrodes arranged to be opposite to the touch emission electrodes and arranged in the second direction; and
   a driving unit electrically connected to the touch emission electrodes and the pixel electrodes, wherein the driving unit is configured to:
   transmit a common electrode signal to the touch emission electrodes and transmit a display signal to the pixel electrodes in a process of scanning the plurality of pixel electrode rows line by line; wherein in a process of transmitting the common electrode signal, simultaneously; and
   transmit a touch signal to the touch emission electrodes each one by one, and transmit a superposed signal to the pixel electrode corresponding to the touch emission electrode which currently receives the touch signal, wherein the superposed signal has a voltage superposing a voltage of the display signal and a voltage of the touch signal.

2. The touch display panel according to claim 1, wherein the driving unit completes at least one touch stage within a first time period, and the plurality of pixel electrode rows is scanned line by line for once simultaneously within the first time period;
   wherein the touch stage is a second time period, the driving unit transmits the touch signal to the touch emission electrodes one by one for once within the second time period.

3. The touch display panel according to claim 2, wherein the driving unit completes a plurality of the touch stages within the first time period of scanning the plurality of pixel electrode rows line by line for once, and two adjacent touch stages are separated with a preset time interval.

4. The touch display panel according to claim 1, wherein the plurality of touch induction electrodes are arranged in the color film substrate.

5. A driving method for driving the touch display panel according to claim 1, comprising:
   transmitting the common electrode signal to the touch emission electrodes and transmitting the display signal to the pixel electrodes in a process of scanning the plurality of pixel electrode rows line by line; wherein in a process of transmitting the common electrode signal, simultaneously; and
   transmitting the touch signal to the touch emission electrodes each one by one, and transmitting the superposed signal to the pixel electrode corresponding to the touch emission electrode which currently receives the touch signal.

6. A touch display panel, comprising:
   an array substrate and a first substrate arranged to be opposite to each other, wherein the array substrate comprises a pixel unit array comprising a plurality of pixel units, each of the pixel units comprising an anode, and all anodes being arranged in a plurality of anode columns in a first direction and are arranged in a plurality of anode rows in a second direction, and the first direction intersects with the second direction;
   a plurality of touch emission electrodes arranged in the first direction and reused as a cathode layer of the array substrate, wherein each of the touch emission electrodes corresponds to at least one of the anode columns;
   a plurality of touch induction electrodes arranged to be opposite to the touch emission electrodes and arranged in the second direction; and
   a driving unit electrically connected to the touch emission electrodes and the anodes, wherein the driving unit is configured to:
   transmit a cathode signal to the touch emission electrodes and transmit a display signal to the anodes in a process of scanning the plurality of anode rows line by line; wherein in a process of transmitting the cathode signal, simultaneously; and transmit a touch signal to the touch emission electrodes each one by one, and transmit a superposed signal to the anode corresponding to the touch emission electrode which currently receives the touch signal, wherein the superposed signal has a voltage superposing a voltage of the display signal and a voltage of the touch signal.

7. The touch display panel according to claim 6, the driving unit completes at least one touch stage within a first time period, and the plurality of anode rows is scanned line by line for once simultaneously within the first time period;

wherein the touch stage is a second time period, the driving unit transmits the touch signal to the touch emission electrodes one by one for once within the second time period.

8. The touch display panel according to claim 7, wherein the driving unit completes a plurality of the touch stages within the first time period of scanning the plurality of anode rows line by line for once, and two adjacent touch stages are separated with a preset time interval.

9. The touch display panel according to claim 6, wherein the plurality of touch induction electrodes are arranged in the first substrate.

10. A driving method for driving the touch display panel according to claim 6, comprising:

transmitting the cathode signal to the touch emission electrodes and transmitting the display signal to the anodes in a process of scanning the plurality of anode rows line by line; wherein in a process of transmitting the cathode signal, simultaneously; and transmitting the touch signal to the touch emission electrodes each one by one, and transmitting the superposed signal to the anode corresponding to the touch emission electrode which currently receives the touch signal.

11. A touch display device comprising a touch display panel, wherein the touch display panel comprises:

an array substrate and a color film substrate arranged to be opposite to each other, wherein the array substrate comprises a pixel unit array comprising a plurality of pixel units, each of the pixel units comprising a pixel electrode, all pixel electrodes being arranged in a plurality of pixel electrode columns in a first direction and being arranged in a plurality of pixel electrode rows in a second direction, and the first direction intersecting with the second direction;

a plurality of touch emission electrodes arranged in the first direction and reused as a common electrode layer of the array substrate, wherein each of the touch emission electrodes corresponds to at least one of the pixel electrode columns;

a plurality of touch induction electrodes arranged to be opposite to the touch emission electrodes and arranged in the second direction; and a driving unit electrically connected to the touch emission electrodes and the pixel electrodes, wherein the driving unit is configured to:

transmit a common electrode signal to the touch emission electrodes and transmit a display signal to the pixel electrodes in a process of scanning the plurality of pixel electrode rows line by line; wherein in a process of transmitting the common electrode signal, simultaneously; and transmit a touch signal to the touch emission electrodes each one by one, and transmit a superposed signal to the pixel electrode corresponding to the touch emission electrode which currently receives the touch signal, wherein the superposed signal has a voltage superposing a voltage of the display signal and a voltage of the touch signal.

12. The touch display device according to claim 11, wherein the driving unit completes at least one touch stage within a first time period, and the plurality of pixel electrode rows is scanned line by line simultaneously for once within the first time period;

wherein the touch stage is a second time period, the driving unit transmits the touch signal to the touch emission electrodes one by one for once within the second time period.

13. The touch display device according to claim 12, wherein the driving unit completes a plurality of the touch stages within the first time period of scanning the plurality of pixel electrode rows line by line for once, and two adjacent touch stages are separated with a preset time interval.

14. The touch display device according to claim 11, wherein the plurality of touch induction electrodes are arranged in the color film substrate.

* * * * *